Figure 1:
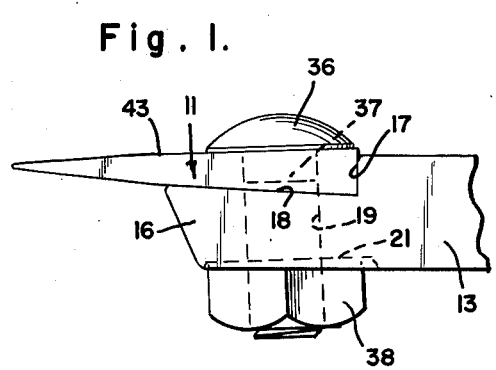

Nov. 13, 1962     G. A. M. PETERSEN     3,063,175

REVERSIBLE TOOTH FOR EARTH DIGGING EQUIPMENT

Filed April 19, 1960

INVENTOR
Gerald A.M. Petersen
BY

United States Patent Office 3,063,175
Patented Nov. 13, 1962

3,063,175
REVERSIBLE TOOTH FOR EARTH
DIGGING EQUIPMENT
Gerald A. M. Petersen, 460 Kifer Road,
Santa Clara, Calif.
Filed Apr. 19, 1960, Ser. No. 23,299
1 Claim. (Cl. 37—142)

This invention relates to a new and improved reversible wedge-shaped tooth for earth-digging equipment such as earth augers and the like. At the present time earth-digging equipment of various types employs a plurality of digging teeth which absorb much of the wear encountered by the tool and also are the portion of the equipment most likely to be broken. The present invention relates to a replaceable tooth for earth-digging equipment which is conveniently and rapidly replaceable and which further may be reversed so that when the tooth is worn on one side it may be turned over and used on the other side.

This application comprises a continuation-in-part of my co-pending United States application Serial No. 682,720, filed September 9, 1957 now Patent No. 2,952,085 for Reversible Tooth for Earth-Digging Equipment.

Accordingly, one of the principal objects and advantages of the present invention is the provision of a tooth which may be attached to and removed from a shank plate or other portion of an earth-digging tool or other piece of similar equipment with a minimum of time and effort.

Another object and advantage of the invention is the provision of a reversible tooth which may be used first on one side and, when worn, may be turned over and used on the other side. One of the particular features of the invention is the facility with which the tooth may be reversed and, after having been reversed, securely locked in position with a minimum of labor and without the use of special tools or equipment.

Still another feature of the invention is the provision of cooperating means on the tooth and shank plate or other portion of the equipment to which the tooth is attached, which assist in securing the tooth in place.

One of the principal advantages of the instant invention is the fact that wear of the tooth occurs on its edge. In other forged replaceable teeth, the means of connection employs a stud and a socket. Wear occurs in the zone of connection between the stud and socket, which is particularly subject to abrasion and other frictional deterioration. Since the socket is conventionally a permanent part of the earth-digging equipment, deterioration of this part of the connection causes discard of the equipment, thereby defeating a primary reason for the use of replaceable teeth. The instant invention eliminates the socket principle and the tooth is wide enough to protect the underlying shank from wear; hence the shank is truly permanent and need not be replaced despite wearing out of many replaceable teeth.

Another object of the invention is to provide means whereby a tooth is formed having a slot extending forwardly of the proximal end thereof, which divides the tooth into two discrete portions at the proximal end. A shank is provided having a step or recess shaped to receive at least a portion of the proximal end of the tooth.

An important feature of the present invention is the fact that the tooth is held in a shank and the shank is secured to the major piece of equipment, such as an auger, so that the tooth and even the shank may be replaced when worn or damaged, without the necessity of discarding the major piece of equipment.

A particular feature of the present invention is the fact that the proximal end of the tooth, including the prongs, is formed in a wedge shape, which wedge shape may have the same slope as the distal portion of the tooth. The shank is formed with a step having a slanted bottom wall complementary to the slope of the prongs of the tooth so as to receive the tooth and firmly engage the same.

Other objects of the present invention will become apparent upon reading the following specification and referring to the accompanying drawings, in which similar characters of reference represent corresponding parts in each of the several views.

Figure 2:
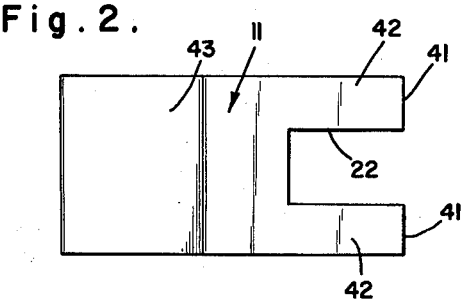

In the drawings:
FIG. 1 is a side elevation of the present invention;
FIG. 2 is a top plan of the tooth.

The present invention relates to a reversible, replaceable wedge-shaped tooth 11. A plurality of such teeth may be attached to a piece of earth-digging equipment such as an earth auger of the type used to dig holes for utility poles. Reference is made to United States Patent No. 2,578,014 which illustrates an earth auger to which the present invention may be attached. As an integral part of such an earth auger or as a separate part thereof is a shank plate 13 attached to the main portion of the auger by various means well understood in this art. The shape of the shank plate 13 varies considerably and the number of teeth 11 attached thereto is likewise the subject of variation. The attachment of each tooth 11 to the shank plate 13 in accordance with the present invention is substantially identical and hence only a single tooth is described and illustrated.

The shank plate 13 is formed with an outwardly projecting root 16 disposed in a direction and at an angle to the axis of rotation of the tool which is determined by proper engineering design. The width of root 16 is substantially the same as that of the tooth, and the length of the root is sufficient to form a secure attachment. The root 16 is cut away in a step having a back wall 17 substantially perpendicular to the direction of the tooth and a bottom wall 18 which is slanted downwardly at an angle. A hole 19 extends transversely through the step 16 in the shank for the reception of bolt 36.

Tooth 11 is formed wedge-shaped throughout its length, being thicker at the proximal than at the distal thereof. A slot 22 is formed extending forwardly from the proximal end of the tooth, the slot being rectangular in shape as shown in FIG. 2. Bolt 36 which may be a carriage bolt having a square upper shank portion 37 dimensioned to fit snugly in the slot 22 extends through slot 22 and through hole 19 in the step 16 of shank 13. The bottom of shank 13 is cut away as indicated by reference numeral 21 to permit nut 38 to seat properly. So long as the nut 38 is drawn securely against step 16, tooth 11 cannot be separated from shank 13. The engagement of the square neck 37 with the side edges of slot 22 prevents the tooth from getting out of alignment with the shank and this is further facilitated by reason of the fact that the back ends 41 of the prongs 42 formed by slot 22 abut the back wall 17 of the step in the shank. When it is necessary to remove the tooth, nut 38 is loosened sufficiently to provide clearance between its head and the bottom face of the step to withdraw the tooth.

It will be understood that although the taper of the proximal end of tooth 11 is shown less than the taper of the distal portion of the tooth (as divided by line 43), nevertheless the angles of taper may be different if desired, or the tapers may be essentially the same.

What is claimed is:
In combination in an earth-digging tool, a shank plate formed with a step shaped to receive the proximal end of a tooth, said step being formed with a back wall disposed substantially normal to the direction of said tooth and an upwardly-outwardly tapered bottom surface formed with a hole substantially normal to the direction of said tooth; a tooth formed of a unitary piece of material and having its proximal end shaped to fit said shank plate, said tooth having a tapered distal portion having substantially flat top and bottom distal faces and having its proximal portion formed with an elongated slot extending entirely through the thickness of said proximal portion from the proximal end and dividing said proximal end into two discrete prongs each having substantially flat top and bottom faces converging toward the distal end of said tooth; the proximal portion of said tooth being formed with a taper complementary to the taper of said bottom surface, the proximal ends of each said prong bearing against said back wall; a carriage bolt having an enlarged head bearing against the top distal face of said tooth having a width greater than the width of said slot, a square neck below said head fitting snugly within and against the side edges of said slot and a shank fitting through said hole and a nut on said shank bearing against the underside of said shank plate, said bolt and nut detachably holding said tooth and shank plate together.

References Cited in the file of this patent

UNITED STATES PATENTS

| | | |
|---|---|---|
| 19,262 | Ramage | Feb. 2, 1858 |
| 26,289 | Peek | Nov. 29, 1859 |
| 26,620 | Roney | Dec. 27, 1859 |
| 28,638 | Reed | June 5, 1860 |
| 210,548 | McKinny | Dec. 3, 1878 |
| 430,166 | Bauman | June 17, 1890 |
| 641,996 | Phillips | Jan. 23, 1900 |
| 881,274 | Williams | Mar. 10, 1908 |
| 1,511,301 | Sanders | Oct. 14, 1924 |
| 1,574,444 | Reynolds | Feb. 23, 1926 |
| 2,064,059 | Fellmeth | Dec. 15, 1936 |
| 2,727,319 | Evans | Dec. 20, 1955 |

FOREIGN PATENTS

| | | |
|---|---|---|
| 24,523 | Great Britain | Dec. 17, 1894 |
| 47,641 | Sweden | July 18, 1918 |